(No Model.)

S. B. OPDYKE.
EYEGLASSES.

No. 265,626. Patented Oct. 10, 1882.

Witnesses:
F. L. Ouraud.
Edw. G. Siggers.

Inventor:
Stacy B. Opdyke,
by W. H. Babcock
Attorney.

UNITED STATES PATENT OFFICE.

STACY B. OPDYKE, OF NEW HAVEN, CONNECTICUT.

EYEGLASSES.

SPECIFICATION forming part of Letters Patent No. 265,626, dated October 10, 1882.

Application filed May 20, 1882. (No model.)

*To all whom it may concern:*

Be it known that I, STACY B. OPDYKE, a citizen of the United States, residing at New Haven, in the county of New Haven and State of Connecticut, have invented certain new and useful Improvements in Eyeglasses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to spectacles and eyeglasses which have spring-plates integral with or attached to the bows thereof and arranged to press against each side of a wearer's nose, thereby holding the glasses in proper position, though adjusting themselves to the shape of the nose.

The object of said invention is to adapt the said spring-plates to still more perfectly and delicately discharge the functions above stated. This is effected by a peculiar construction or conformation of spring-plates or supplemental plates connected thereto and padding. I also make use of a peculiar means of fastening the cork padding to the spring-plates, as hereinafter set forth.

Figure 1:
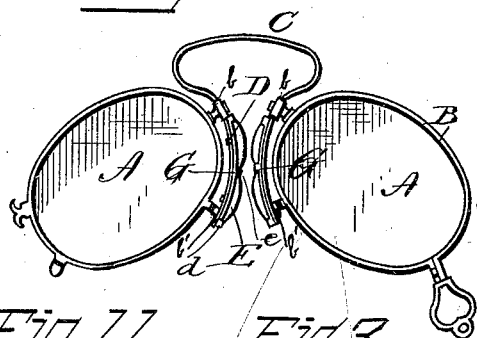
Figure 2:
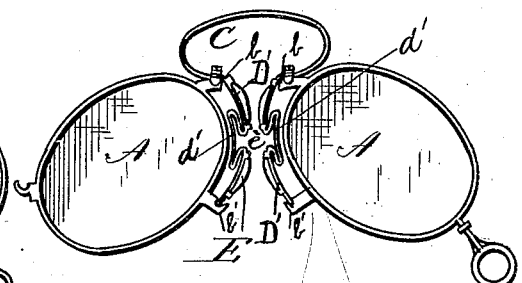
Figures 3, 11:
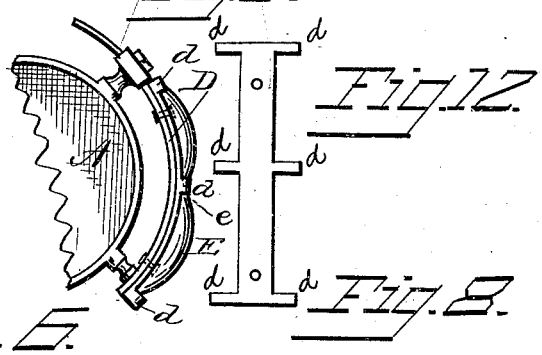
Figure 4:
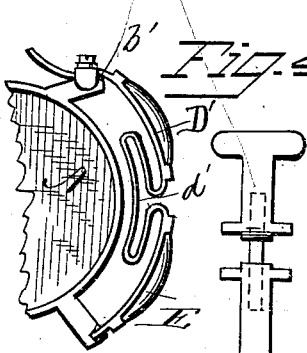
Figures 6, 8, 10, 12:
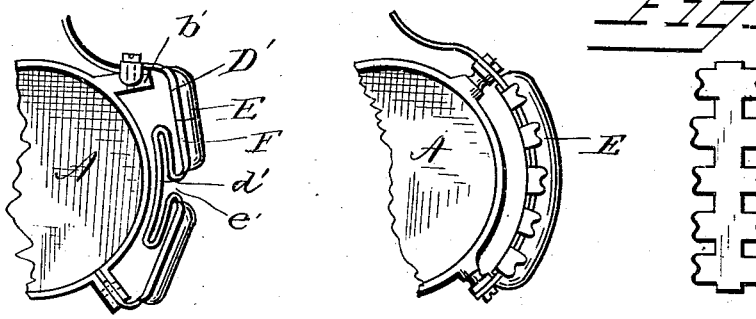
Figures 5, 9:
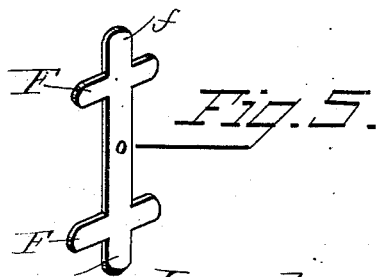

In the accompanying drawings, Figure 1 represents an elevation of a pair of eyeglasses embodying my invention. Fig. 2 represents a similar view of another form of the same. Fig. 3 represents a view in detail of the form of plate shown in Fig. 1 prior to attaching the cork padding thereto. Fig. 4 represents a detail view of the form of plate shown in Fig. 2, prior to attaching the same to the eyeglass-frames and the cork padding; and Figs. 5 and 6 represent detail views of another form of plate, taken respectively before and after the attachment of said padding thereto.

A designates the glasses or lenses; B, the frames surrounding the same, and C the interposed elastic bow, clamped in the usual manner to lugs or blocks $b$ on the inner sides of said frames near the inner termini of their longest axes. In Fig. 1 the bow is shown as having its ends extended from said lugs down to a second pair of lugs, $b'$, also attached to or formed with said frames, the said ends conforming to the curvature thereof, and being clamped or otherwise secured to said lugs $b'$. These extended curved ends of the bow form a pair of spring-plates, which are held against the nose by the elasticity of the remainder of the bow, aided to some extent by their own elasticity. These plates are, however, faced by additional plates D, which may be riveted thereto, and which are provided, as shown in Figs. 3 and 11, with three pairs of lateral lips, $d$, one pair being at each end of the plate and one in the middle. These lips are used for fastening to each plate D a strip of cork padding, E, which comes next to the wearer's nose and clings thereto. The middle pair of said lips compresses the middle part of the strip of padding, so as to form therein a waist or constricted belt, $e$. These waists $e$ correspond to that part of the bridge of the nose where the bones are usually most prominent at the sides, and enable the pads and spring-plates to get a better hold upon the same than would otherwise be possible.

The method of attaching the pads E to the plates is very simple, consisting only in placing each strip of padding against the face of the plate and folding the lips $d$ over it. Of course the lips $d$ might be formed on the edges of the bow itself; but by using a supplemental plate I am enabled to retain the full elasticity of the bow itself with the requisite flexibility of the fastening-lips. Whenever the pad becomes worn or soiled it may be easily withdrawn (after bending back the lips) and a new one substituted for it.

In Fig. 2 the bow is shown as ending at the lugs $b$, the spaces between lugs $b$ and lugs $b'$ being occupied by two delicate spring-plates, D', each of which is attached to said lugs of each frame C respectively at its ends, and has its middle part bent backward into a flattened bow, $d'$, which increases its elasticity, the open neck $e'$ of said bow constituting a break in the padding, which answers the same purpose as waist $e$, before described. The remainder of the said plate consists of an upper and a lower curved surface, each of which is provided with lateral lips $d$, which close upon a short strip of cork padding, E. Each plate D' has two of these strips, the neck $e'$ separating them. Each strip is held by two pairs of lips $d$.

The plate shown in Figs. 5 and 6 has its ends F prolonged beyond the ends of the padding and provided with lateral ears $f$, which turn back against the edges of the main part of said plate. The waist at the middle of the pad is formed by a belt or short band of metal, (marked G,) which is passed around the pad and plate, its ends being forced from behind through a hole in said plate into said pad.

Of course the fastening devices and automatically-adjusting devices hereinbefore described may be used with other padding or lining material besides cork; but the latter is so light, so impervious to moisture, so easily cleaned, so soft, and so durable that it may fairly be regarded as uniting in a higher degree than any other known substance the qualities requisite for such uses.

Figure 7:
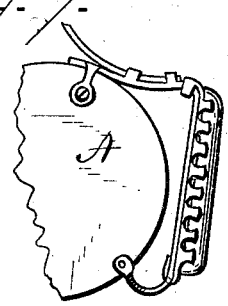

Additional modifications are represented in Figs. 7 and 8, in both of which a single unbroken pad without depression is used on each side of the wearer's nose and fastened by lips or ears extending laterally from the plate at short intervals throughout its length. In Fig. 7 these lips are formed on a plate arranged in front of another, while in Fig. 8 they extend from a plate arranged behind another. Figs. 9 and 10 represent detail views of fastening-plates such as are shown in Figs. 7 and 8. Figs. 11 and 12 represent enlarged views of part of the bow pad-plate and part of one eyeglass. (Shown in Figs. 1 and 2, respectively.)

Having thus fully described my invention, what I claim as new, and desire to secure by Letters Patent, is—

1. In combination with the eyeglass frames and bow, the padding E, for each side of the bow, and a pair of plates having lateral lips, which are bent upon the padding to hold it in place.

2. A pair of padded yielding plates adapted to fit the sides of the wearer's nose, in combination with the eyeglasses and their necessary attachments, each pad having a waist or depression in its middle, for the purpose set forth.

3. In combination with eyeglass-frames and the bow, a pair of padded spring-plates, D', each having a depression and opening formed in its middle, and a bow, $d'$, formed in it behind said opening part, substantially as set forth.

In testimony whereof I affix my signature in presence of two witnesses.

STACY B. OPDYKE.

Witnesses:
FRED B. KELLAM,
WILLIS PARKER.